United States Patent

Mochizuki et al.

(10) Patent No.: US 10,533,579 B2
(45) Date of Patent: Jan. 14, 2020

(54) ELECTRIC PUMP AND MOUNTING STRUCTURE OF ELECTRIC PUMP

(71) Applicant: AISIN SEIKI KABUSHIKI KAISHA, Kariya-shi, Aichi-ken (JP)

(72) Inventors: Kentaro Mochizuki, Nagoya (JP); Shuji Hattori, Nagoya (JP); Hiroaki Kumagai, Kariya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 171 days.

(21) Appl. No.: 15/683,008

(22) Filed: Aug. 22, 2017

(65) Prior Publication Data

US 2018/0087533 A1    Mar. 29, 2018

(30) Foreign Application Priority Data

Sep. 27, 2016   (JP) ................. 2016-188651

(51) Int. Cl.

| | |
|---|---|
| *F04D 29/66* | (2006.01) |
| *F04D 13/06* | (2006.01) |
| *F04D 29/40* | (2006.01) |
| *F01P 5/10* | (2006.01) |
| *F04D 29/42* | (2006.01) |

(Continued)

(52) U.S. Cl.
CPC ............. *F04D 29/66* (2013.01); *F04D 13/06* (2013.01); *F04D 29/40* (2013.01); *F01P 5/10* (2013.01)

(58) Field of Classification Search
CPC .......... F04D 29/66; F04D 13/06; F04D 29/40; F04D 29/42; F04D 29/62; F04D 29/669; F04D 29/5853; F04D 29/5893; F04D 29/664; F04D 29/668; F16F 15/08; F01P 5/10; F05D 2260/96

See application file for complete search history.

(56) References Cited

U.S. PATENT DOCUMENTS

| | | | | |
|---|---|---|---|---|
| 5,003,210 A | * | 3/1991 | Liu ................. | H02K 5/167 310/87 |
| 5,397,950 A | * | 3/1995 | Norbury, Jr. ........... | H02K 1/187 310/51 |

(Continued)

FOREIGN PATENT DOCUMENTS

| | | |
|---|---|---|
| JP | 2003-4099 A | 1/2003 |
| JP | 2011-27203 A | 2/2011 |

OTHER PUBLICATIONS

Machine Translation of JP 2011027203 [retrieved on Apr. 5, 2019]. Retrieved from: Espacenet.*

*Primary Examiner* — Jason D Shanske
*Assistant Examiner* — Eric J Zamora Alvarez
(74) *Attorney, Agent, or Firm* — Buchanan Ingersoll & Rooney PC (57) ABSTRACT

An electric pump includes: a pump main body that accommodates a pump unit and a motor; and a plate-shaped elastic member that is wound around an outer circumference of the pump main body such that a longitudinal direction of the elastic member extends along a circumferential direction of the pump main body, in which the elastic member is provided with a pair of first locking portions on both end portions in the longitudinal direction, and the outer circumference of the pump main body is provided with a pair of first locking target portions that are locked to the first locking portions.

7 Claims, 5 Drawing Sheets

(51) Int. Cl.
*F04D 29/62* (2006.01)
*F16F 15/08* (2006.01)

(56) References Cited

U.S. PATENT DOCUMENTS

| | | | | |
|---|---|---|---|---|
| 5,696,360 A | * | 12/1997 | Tiemeyer | H02K 5/24 181/202 |
| 6,424,066 B1 | * | 7/2002 | Watson | F04D 29/047 175/92 |
| 2014/0125160 A1 | * | 5/2014 | Nara | H02K 5/24 310/51 |
| 2014/0299735 A1 | * | 10/2014 | Hein | F16F 1/371 248/562 |

* cited by examiner

ELECTRIC PUMP AND MOUNTING STRUCTURE OF ELECTRIC PUMP

CROSS REFERENCE TO RELATED APPLICATIONS

This application is based on and claims priority under 35 U.S.C. § 119 to Japanese Patent Application 2016-188651, filed on Sep. 27, 2016, the entire contents of which are incorporated herein by reference.

TECHNICAL FIELD

This disclosure relates to an electric pump and a mounting structure of the electric pump that includes a pump unit and a motor that drives the pump unit.

BACKGROUND DISCUSSION

A vehicle uses an electric pump that circulates cooling water or the like. In a case where such an electric pump is mounted on the vehicle, it is necessary to reduce an occurrence of transmission of vibration of the electric pump to the vehicle, with quietness of the vehicle maintained during driving. In addition, it is necessary to reduce vibration transmitted to the electric pump from outside, with the electric pump stably operating.

JP 2003-4099A (Reference 1) discloses a configuration in which a cylindrical rubber is mounted on a hydraulic pump such that vibration is reduced. In addition, JP 2011-27203A (Reference 2) discloses a configuration in which a band-like elastic member is disposed to be divided between a mounting member and an electric pump, when the electric pump is mounted on the mounting member. In the configuration disclosed in Reference 2, the elastic member is provided with a plurality of projecting portions formed on a side thereof with which the mounting member is brought into contact, and the mounting member is provided with holes through which the projecting portions of the elastic member penetrate. In a state in which the projecting portions of the elastic member penetrate through the holes of the mounting member, the elastic member is held by the mounting member. The electric pump is clamped by using the mounting member that holds the elastic member on an inner circumference side thereof in such a manner, mounting of the electric pump on the mounting member is completed.

In general, from the viewpoint of mass productivity, the elastic member that is installed in the pump main body and reduces the vibration is molded by using a die. In Reference 1, the elastic member is the cylindrical rubber. When the cylindrical rubber is molded by using the die, a large occupation region is necessary for the die. This is because the inner circumference of the cylindrical rubber is a dead space. Therefore, in a case where a plurality of pieces of cylindrical rubber are molded with one die, a large die is necessary, and thus it is necessary to increase manufacturing equipment in size. In addition, when the cylindrical rubber is mounted on the hydraulic pump, it is necessary to stretch the entire cylindrical rubber outward in a radial direction thereof such that the hydraulic pump passes through the inner circumference region of the cylindrical rubber. Therefore, a shape of the pump may make it difficult to mount the cylindrical rubber.

In addition, in a case of the configuration disclosed in Reference 2, since it is necessary to mount two elastic members on the electric pump, the number of components for reducing the vibration of the electric pump increases. In addition, when the electric pump is mounted on the mounting member, it is necessary to mount the two elastic members on the mounting member. Therefore, workability is degraded when the electric pump is mounted on the mounting member.

Thus, a need exists for an electric pump and a mounting structure of the electric pump which are not susceptible to the drawback mentioned above.

SUMMARY

A feature of an electric pump according to an aspect of this disclosure resides in that the electric pump includes: a pump main body that accommodates a pump unit and a motor; and a plate-shaped elastic member that is wound around an outer circumference of the pump main body such that a longitudinal direction of the elastic member extends along a circumferential direction of the pump main body, in which the elastic member is provided with a pair of first locking portions on both end portions in the longitudinal direction, and the outer circumference of the pump main body is provided with a pair of first locking target portions that are locked to the pair of the first locking portions.

A feature of a mounting structure of an electric pump according to another aspect of this disclosure resides in that the electric pump is mounted on a mounting member, and the outer circumference side of the elastic member is fixed to the mounting member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments disclosed here will be described with reference to the figures. For example, an electric pump of an embodiment disclosed here is provided in a supply system or the like of cooling water in an automobile. However, a use of the electric pump is not limited to the automobile, and may be used for supply of a fluid other than the cooling water.

Figure 1:
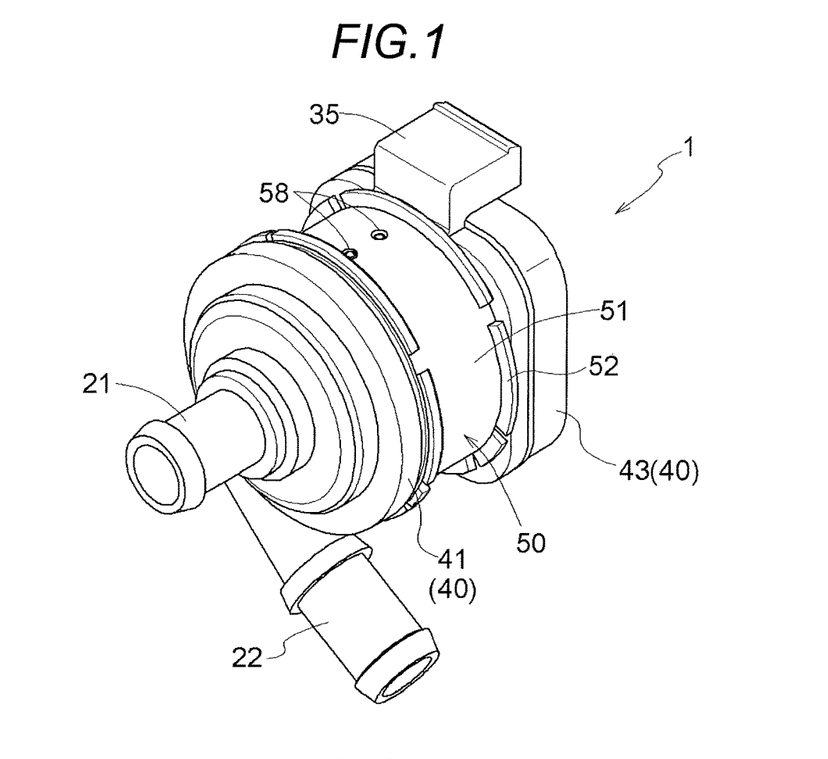
FIG. 1 is a perspective view of an electric pump.
Figure 2:
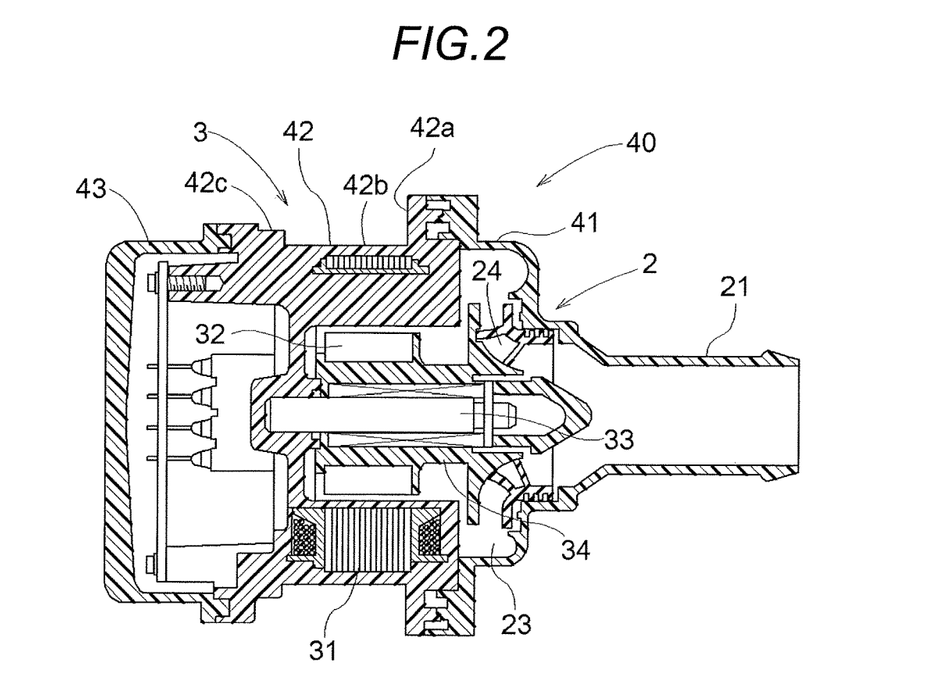
FIG. 2 is a sectional view of a pump main body in an axial direction thereof.

As illustrated in FIGS. 1 to 5, an electric pump 1 includes a pump unit 2, a motor 3 that drives the pump unit 2, a pump main body 40 that accommodates the pump unit 2 and the motor 3, and an elastic member 50 that is provided around the pump main body 40. As illustrated in FIG. 2, the pump main body 40 is configured by connecting a pump housing 41 that accommodates the pump unit 2 and a motor body 42 that accommodates the motor 3.

As illustrated in FIG. 1, the pump housing 41 is provided with cylindrical inlet and outlet ports 21 and 22. Each of the inlet port 21 and the outlet port 22 communicates with an impeller chamber 23 (refer to FIG. 2) formed inside the pump housing 41. The impeller chamber 23 accommodates an impeller 24. When the impeller 24 rotates, a fluid is suctioned from the inlet port 21 to the impeller chamber 23, and a fluid is discharged from the impeller chamber 23 to the outlet port 22.

As illustrated in FIG. 2, the motor body 42 is integrally provided with a stator 31 inside thereof through insert molding. A rotor 32, in which a magnet is incorporated, is provided on the inner side in a radial direction of the stator 31, with a gap from the stator 31 in the radial direction. A rotary shaft 33 has an end portion that is buried in the motor body 42, and is configured not to be rotatable with respect to the motor body 42. A rotary member 34 is disposed on an outer circumference side of the rotary shaft 33 via a bearing member and is provided to be rotatable around the rotary shaft 33. The rotor 32 is disposed at one end portion of the rotary member 34, and the impeller 24 is formed on the other end portion of the rotary member 34. In the configuration, when the rotor 32 receives magnetic force from the stator 31, the rotor 32 rotates, and the rotary member 34 and the impeller 24 rotate together along with the rotor 32.

The pump main body 40 includes a driver case 43 that accommodates a driver that controls the motor 3. The driver case 43 is provided to be connected to the motor body 42, and the driver case 43 and the pump housing 41 are positioned on both sides of the motor body 42. The motor body 42 is provided with a connector 35 for connecting with a power supply and types of control of the motor 3.

Figure 3:
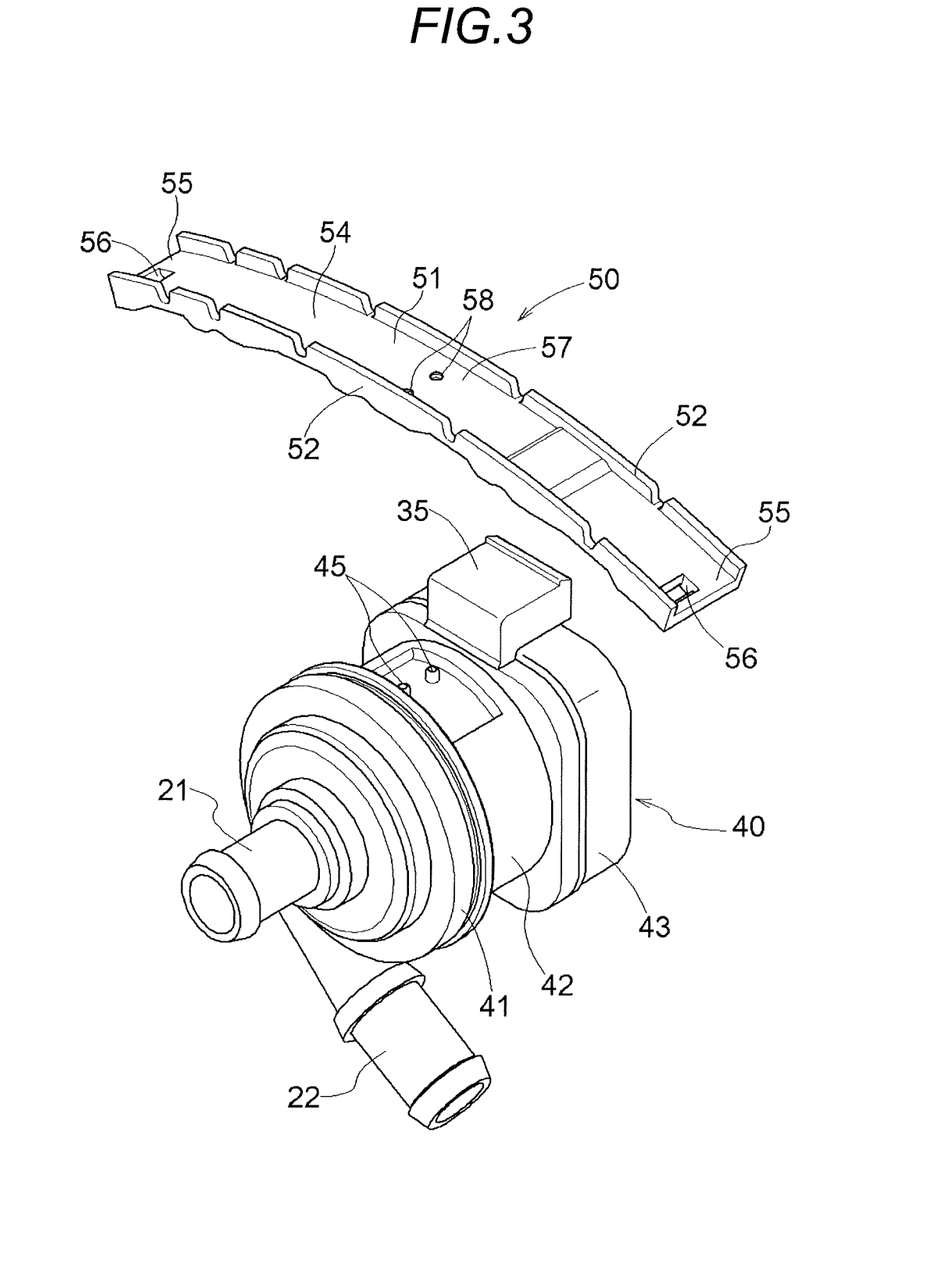
FIG. 3 is an exploded perspective view of the electric pump.
Figure 6:
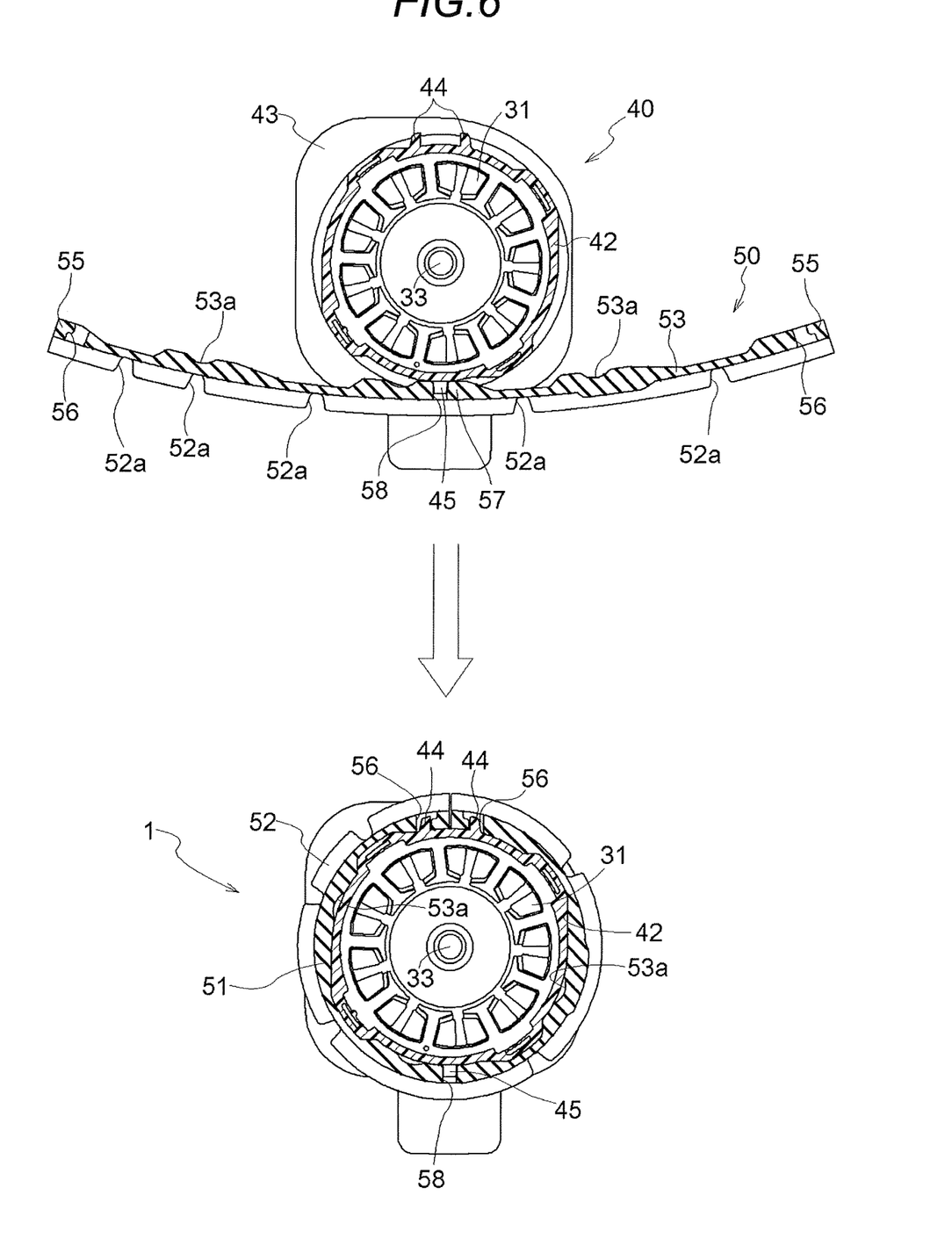
FIG. 6 is a cross-sectional view illustrating a process of mounting an elastic member on the pump main body.

The elastic member 50 is formed to have a plate shape as illustrated in FIG. 3 and is wound around the outer circumference of the pump main body 40 such that a longitudinal direction of the elastic member extends along a circumferential direction of the pump main body (refer to FIGS. 1 and 6). In the embodiment, the elastic member 50 is wound around the outer circumference of the motor body 42 of the pump main body 40. For example, the elastic member 50 is made of a rubber material such as ethylene-propylene-diene monomer rubber (EPDM).

The elastic member 50 is provided with a plate-shaped portion 51 and upright portions 52 and is formed to have a smoothly curved shape in the longitudinal direction. As illustrated in FIG. 6, a first surface 53 of the plate-shaped portion 51 on a side on which the plate-shaped portion comes into contact with the motor body 42 is formed to have a shape corresponding to a shape of the outer circumference of the motor body 42. The first surface 53 is provided with a recessed thin portion 53a that does not come into contact with the outer circumference of the motor body 42.

The upright portions 52 are provided on both sides of the elastic member 50 in a transverse direction along the longitudinal direction of the elastic member 50 and are upright from a surface (second surface 54) on a side opposite to the first surface 53 (surface on a side that comes into contact with the motor body 42) (refer to FIG. 3). The upright portion 52 is provided with a plurality of recessed thin portions 52a in the longitudinal direction of the elastic member 50. The thin portion 52a is provided in a region in which the plate-shaped portion 51 has a small plate thickness. The thin portions 52a and 53a are provided, and thereby it is possible to loosen a very tensile state occurring when the elastic member 50 is wound around the motor body 42.

The entire motor body 42 has a cylindrical shape, is provided with a flange 42a on one end portion on a side of the pump housing 41, and is provided with a flange 42c on one end portion on a side of the driver case 43. The driver case 43 is provided to have a lid shape with respect to the motor body 42. The elastic member 50 is disposed in a cylindrical portion 42b of the motor body 42, and the upright portions 52 come into contact with the flange 42a and the flange 42c. In this manner, the elastic member 50 wound around the motor body 42 comes into contact with the pump main body 40 in a direction along the rotary shaft 33.

As illustrated in FIG. 3, the elastic member 50 is provided with a pair of holes 56 (an example of a first locking portion) on both end portions 55 in the longitudinal direction and a hole 58 (an example of a second locking portion) at a central portion 57 in the longitudinal direction. The hole 56 is formed to have a rectangular shape and penetrates through the plate-shaped portion 51. The two holes 58 are provided in the transverse direction of the elastic member 50 and penetrate through the plate-shaped portion 51.

Figure 4:
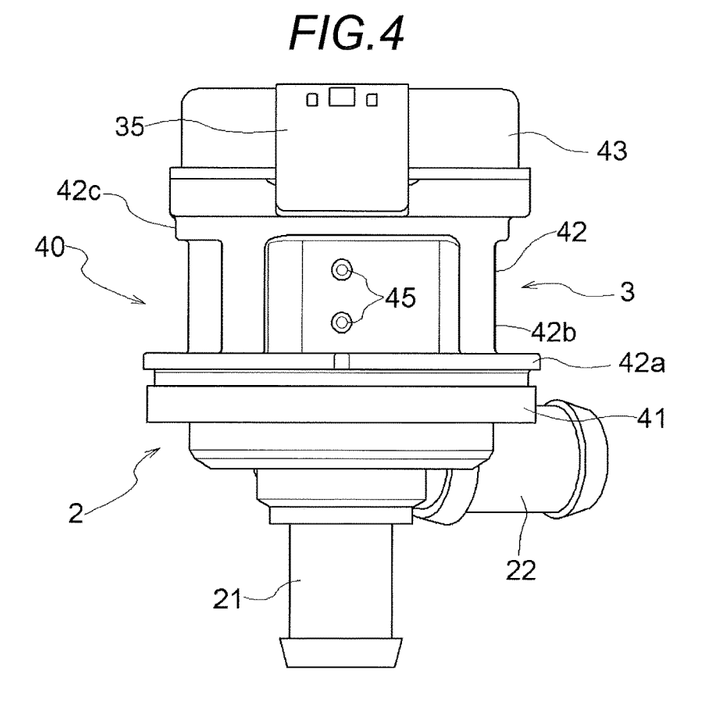
FIG. 4 is a side view of the pump main body on one side.
Figure 5:
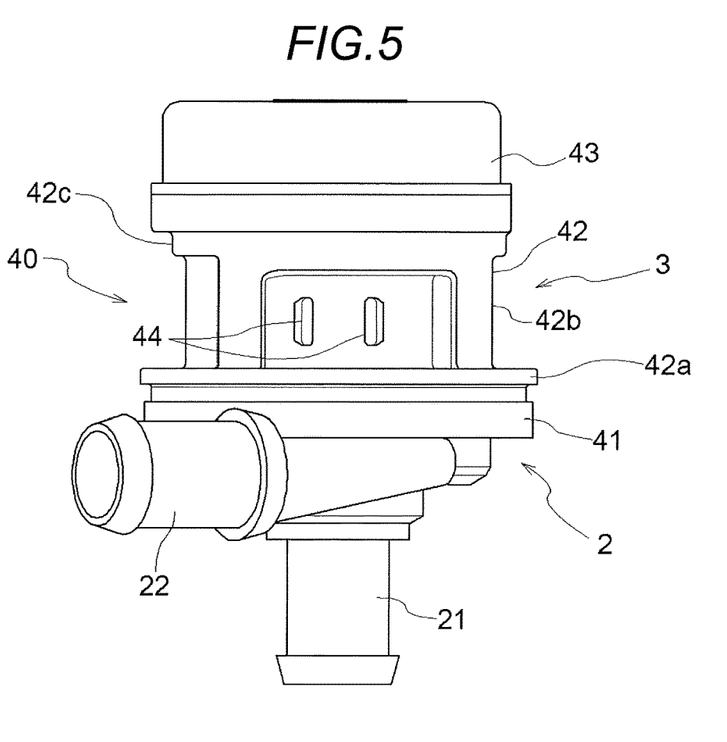
FIG. 5 is a side view of the pump main body on the other side.

As illustrated in FIGS. 4 and 5, the outer circumference of the motor body 42 is provided with hooks 44 (an example of first locking target portion) that are locked with the pair of holes 56 of the elastic member 50 and protrusions 45 (an example of second locking target portion) that are locked with the holes 58. The hook 44 is horizontally formed in a direction of the rotary shaft 33 in the motor body 42. The two protrusions 45 are positioned to be separated from the hook 44 by a substantially half of the circumference on the outer circumference of the motor body 42 and are provided in a direction along the rotary shaft 33.

With reference to FIG. 6, a method for mounting the elastic member 50 on the motor body 42 (pump main body 40) is described. First, the hole 58 of the elastic member 50 is locked with the protrusion 45 of the motor body 42. In this manner, the central portion 57 of the elastic member 50 in the longitudinal direction is positioned and held at a predetermined position of the outer circumference of the motor body 42.

Next, regions from the central portion 57 to the both end portions 55 of the elastic member 50 are wound around the motor body 42 in this order, and the hooks 44 of the motor body 42 are inserted into the holes 56 provided in the both end portions 55 of the elastic member 50.

It is not possible for the hooks 44 to be inserted into the holes 56 with a natural length of the elastic member as is, and the hooks 44 of the motor body 42 are formed to be inserted into the holes 56 in a state in which the elastic member 50 is stretched to both end sides in the longitudinal direction and is elastically deformed. At this time, since the elastic member 50 has the resilience from an elastically deformed state, the inner circumferential surface of the holes 56 comes into contact with the hooks 44 and the holes 56 are locked with the hooks 44. In this manner, the elastic member 50 is held in a state of being wound around the motor body 42.

Figure 7:
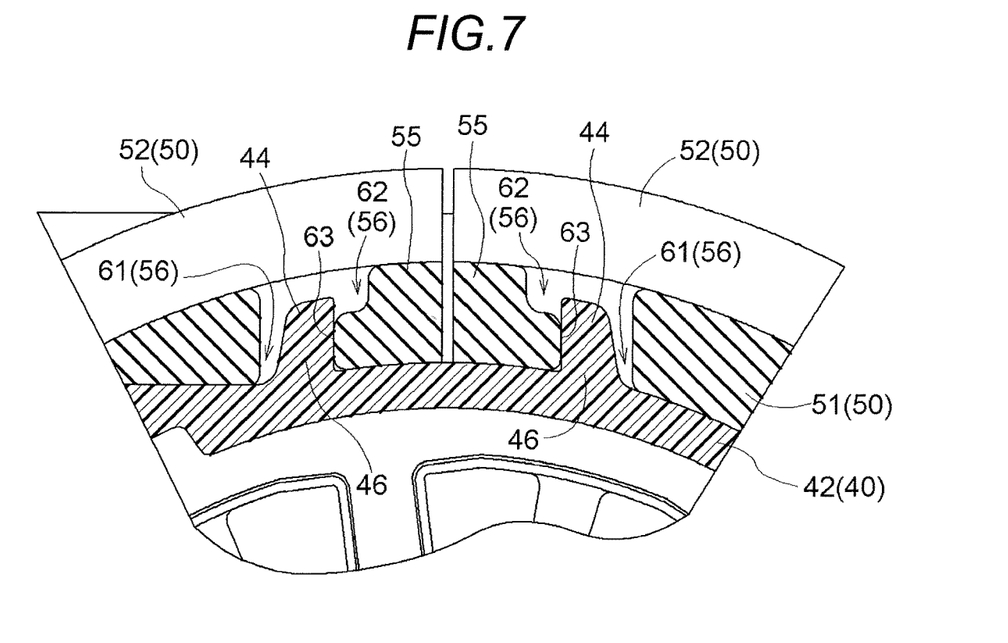
FIG. 7 is an enlarged view of a main part in a state in which the elastic member is mounted on the pump main body.

As illustrated in FIG. 7, the hole 56 of the elastic member 50 is formed by both of a first hole 61 positioned on a side closer to the motor body 42 in a plate thickness direction of the elastic member 50 and a second hole 62 positioned on a side away from the motor body 42, the first hole communicating with the second hole. In addition, when viewed from the outer side of the motor body 42 in the radial direction, the second hole 62 is formed to be wider than the first hole 61 on an end portion 55 side of the elastic member 50 in the longitudinal direction.

The top portions of the pair of hooks 44 are set to be positioned in the second hole portion 61. Therefore, when the elastic member 50 has the resilience from the elastically deformed state, an inner circumferential surface 63 of the first hole 61 comes into contact with a base 46 of the hook 44. In addition, the pair of hooks 44 are not is parallel in the radial direction of the pump main body 40, but are formed to have the top portions which are inclined to be closer to the end portion 55 of the elastic member 50 than the base 46. In this manner, the inner circumferential surface 63 of the first hole 61 is embedded in the base 46 of the hook 44. As a result, since a locking state of the hook 44 and the hole 56 is stable, it is possible to increase a holding force of the elastic member 50 with respect to the pump main body 40.

Figure 8:
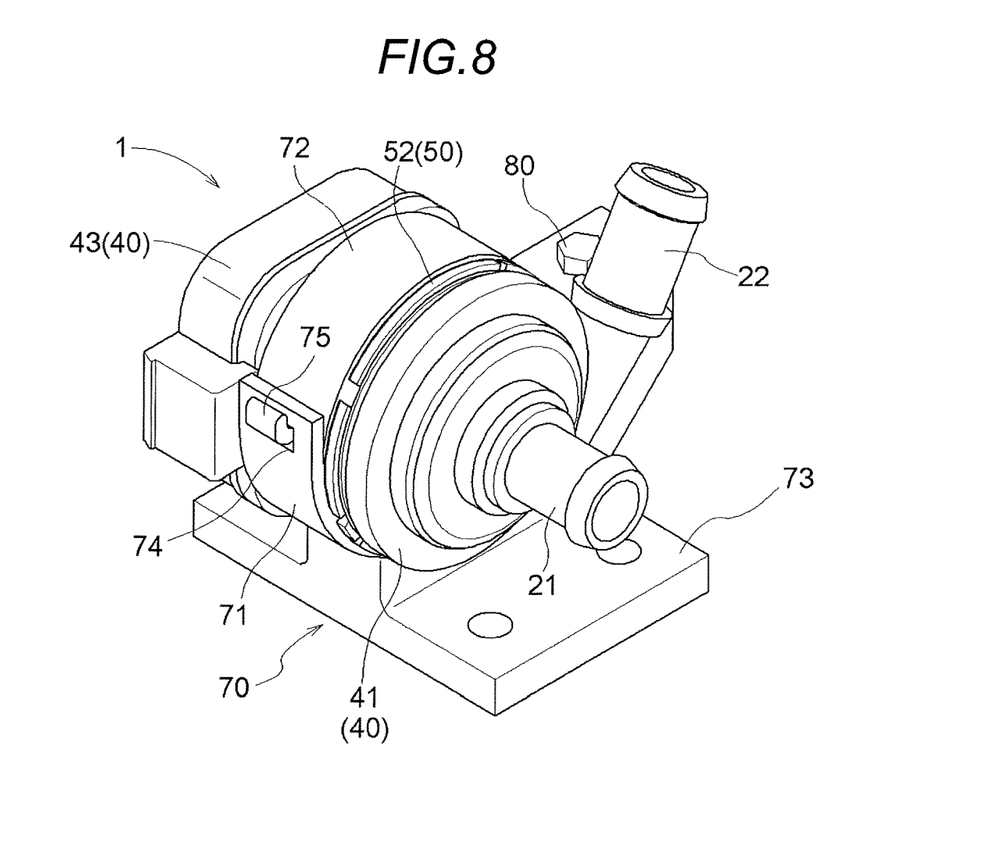
FIG. 8 is a perspective view illustrating a mounting structure of an electric pump.

As illustrated in FIG. 8, the electric pump 1 is disposed in the inside or the like of the vehicle in a state in which the electric pump is mounted on a bracket 70 (an example of a mounting member). The bracket 70 is provided with a first member 71 and a second member 72 that have curved inner circumferential surfaces and holds the electric pump 1 by the first member 71 and the second member 72. Specifically, by using the first member 71 and the second member 72, the outer circumference of the elastic member 50 of the electric pump 1 is clamped. A fixing portion 73 that is fixed to a vehicle or the like is connected to the first member 71.

Each of the first member 71 and the second member 72 has an inner circumferential surface along a half of the outer circumference of the elastic member 50. The first member 71 is provided with a bolt hole (not illustrated) in one end portion thereof, and a locking hole 74 in the other end portion thereof. The second member 72 is provided with a bolt hole (not illustrated) in one end portion thereof, and a locking claw portion 75 in the other end portion thereof.

When the electric pump 1 is mounted on the bracket 70, first, the electric pump 1 is disposed such that the outer side of the elastic member 50 comes into contact with the first member 71. Next, the second member 72 is temporarily fixed to the first member 71. Specifically, in a state in which the locking claw portion 75 of the second member 72 is locked in the locking hole 74 of the first member 71, the second member 72 is disposed along the outer circumference (elastic member 50) of the electric pump 1. Then, a bolt 80 is fastened into bolt holes provided in the first member 71 and the second member 72. In this manner, the mounting of the electric pump 1 on the bracket 70 is completed.

Since the electric pump 1 is held in a state in which the elastic member 50 of the electric pump 1 is clamped by the bracket 70, it is possible to reduce the vibration from the electric pump 1 to the outside and the vibration from the outside to the electric pump 1. Here, the elastic member 50 wound around the pump main body 40 is partitioned into the upright portions 52 which face each other in the transverse direction. Therefore, the first member 71 and the second member 72 can be disposed to come into contact in three directions including the plate-shaped portion 51 and the upright portions 52 of the elastic member 50.

Other Embodiments (1) In the embodiment described above, an example, in which the hook 44 or the protrusion 45 is provided as the locking target portion on the outer circumference of the pump main body 40, and the elastic member 50 is provided with the holes 56 and 58 as the locking portions, is described; however, the outer circumference of the pump main body 40 may be provided with the hole as the locking target portion and the elastic member 50 may be provided with the hook or the protrusion as the locking portion.

(2) In the embodiment described above, an example, in which the first locking portion and the first locking target portion are configured of a single hole 56 and a single hook 44, is described; however, a configuration of including a plurality of holes 56 and hooks 44 may be employed. In addition, in the embodiment described above, an example, in which the second locking portion and the second locking target portion are configured of the plurality of holes 58 and the plurality of protrusions 45, is described; however, a configuration of including one hole 58 and one protrusion 45 may be employed.

(3) The electric pump 1 may have a configuration in which the elastic member 50 is not provided with the upright portions 52.

(4) The electric pump 1 may have a configuration in which the second locking portions (holes 58 of the elastic member 50) and the second locking target portions (protrusions 45 on the outer circumference of the pump main body 40) are not provided.

(5) In the embodiment described above, an example, in which the hole 56 (first locking portion) provided in the elastic member 50 is configured to include both of the first hole 61 and the second hole 62 that is wider than the first hole 61 on the end portion 55 side, is described; however, the hole 56 may have a single hole shape.

The embodiments disclosed here can be widely used in an electric pump that accommodates a motor and a pump unit.

A feature of an electric pump according to an aspect of this disclosure resides in that the electric pump includes: a pump main body that accommodates a pump unit and a motor; and a plate-shaped elastic member that is wound around an outer circumference of the pump main body such that a longitudinal direction of the elastic member extends along a circumferential direction of the pump main body, in which the elastic member is provided with a pair of first locking portions on both end portions in the longitudinal direction, and the outer circumference of the pump main body is provided with a pair of first locking target portions that are locked to the pair of the first locking portions.

According to this configuration, the electric pump has the elastic member that is wound around the outer circumference of the pump main body, and the pair of first locking portions on both end portions of the elastic member are locked with the pair of first locking target portions on the outer circumference of the pump main body. As described above, since the elastic member is disposed to be wound around the outer circumference of the pump main body, it is possible to easily mount the elastic member on the pump main body of the electric pump. In addition, since the locking portion of the elastic member is locked with the locking target portion of the pump main body, it is possible to obtain the electric pump in which the elastic member that reduces the vibration of the electric pump is stably held around the outer circumference of the pump main body. In addition, the elastic member is configured to have a plate shape, and thereby a dead space is reduced in a die in which the elastic member is molded. Hence, it is possible to mold the elastic member by using a small die, and it is possible to easily mold a plurality of elastic members in one die. Further, since the electric pump maintains a state in which the elastic member is mounted on the pump main body, workability is improved when the electric pump is mounted on the mounting member.

Another feature of the electric pump according to the aspect of this disclosure resides in that the elastic member is provided with upright portions that are upright on both sides of the elastic member in a transverse direction along the longitudinal direction of the elastic member on a side thereof opposite to a side on which the elastic member comes into contact with the pump main body.

According to this configuration, the elastic member is provided with the upright portions on the side opposite to the side on which the elastic member comes into contact with the pump main body, and thereby it is possible to increase a region in which the elastic member can come into contact with the pump main body. In addition, the elastic member has a shape partitioned into the upright portions which face each other in the transverse direction. Therefore, when the electric pump is mounted on the mounting member, the mounting member can be mounted to be in contact in three directions including the facing upright portions, and it is easy to perform position adjustment of the elastic member and the mounting member.

Another feature of the electric pump according to the aspect of this disclosure resides in that the elastic member is provided with a second locking portion at the central portion in the longitudinal direction, and the outer circumference of the pump main body is provided with a second locking target portion that is locked to the second locking portion.

A distance between the pair of first locking portions on both end portions in the elastic member substantially corresponds to the outer circumference of the pump main body. As described above, since a distance between the pair of first locking portions is long, in some cases it takes time to appropriately position and lock the pair of first locking portions of the elastic member with the pair of first locking target portions of the pump main body when the elastic member is wound around the outer circumference of the pump main body. According to this configuration, the elastic member is provided with the second locking portion at the central portion in the longitudinal direction, and the outer circumference of the pump main body is provided with the second locking target portion that is locked to the second locking portion. In this configuration, for example, the second locking portion of the elastic member is locked with the second locking target portion of the pump main body, and the central portion of the elastic member in the longitudinal direction is positioned on the outer circumference of the pump main body. Then, it is possible to lock the pair of first locking portions on both end portions of the elastic member with the pair of locking target portions of the pump main body. In this manner, since the distance between the locking portions in the elastic member is shortened (substantially, to a half of the circumference of the pump main body), it is easy to perform the position adjustment of the first locking portions on both end portions of the elastic member with respect to the first locking target portions of the pump main body. As a result, it is possible to early and appropriately dispose the elastic member on the pump main body.

Another feature of the electric pump according to the aspect of this disclosure resides in that the first locking portions are holes that penetrate through the elastic member in a plate thickness direction thereof, and the first locking target portions are hooks that are upright on the outer circumference of the pump main body and are inserted into the hole, each of the holes is formed by communicating a first hole positioned on a side closer to the pump main body in the plate thickness direction and a second hole positioned on a side away from the pump main body, and when viewed from the outer side of the pump main body in the radial direction, the second hole is formed to be wider than the first hole toward an end portion side of the elastic member in the longitudinal direction, and the top portion of each of the hooks is positioned in the second hole.

For example, in a case where the first locking portion of the elastic member is configured of the hole, and the first locking target portion of the pump main body is configured of the hook, an inner circumferential surface of the hole of the elastic member comes into contact with the hook of the pump main body, and thus the elastic member is held by the pump main body in a state in which the elastic member is wound around the outer circumference of the pump main body. At this time, when the inner circumferential surface of the hole comes into contact with a portion closer to the top portion of the hook, and the elastic member has resilience from an elastically deformed state, there is a concern that the hole of the elastic member will pass over the top portion of the hook out of the hook and the elastic member will fall from the pump main body.

According to this configuration, the hole of the elastic member is formed by both of the first hole positioned on the side closer to the pump main body in the plate thickness direction and the second hole positioned on the side away from the pump main body, the first hole communicating with the second hole. When viewed from the outer side of the pump main body in the radial direction, the second hole is formed to be wider than the first hole on the end portion side of the elastic member in the longitudinal direction. Then, of the holes, the inner circumferential surface of the first hole that is closer to the pump main body comes into contact with the hook, and thus the inner circumferential surface of the hole can be brought into contact with a base of the hook. In this manner, it is possible to reduce a case where the hole passes out of the top portion of the hook, and it is possible to increase a holding force of the elastic member with respect to the pump main body.

A feature of a mounting structure of an electric pump according to another aspect of this disclosure resides in that the electric pump is mounted on a mounting member, and the outer circumference side of the elastic member is fixed to the mounting member.

According to this configuration, since the outer circumference side of the elastic member is fixed to the mounting member and the electric pump is mounted on the mounting member, it is possible to mount the electric pump on the mounting member without degrading a vibration-proof function of the electric pump. In addition, since the electric pump that is in a state in which the elastic member is mounted thereon is mounted on the mounting member, workability of mounting the electric pump on a bracket is improved.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An electric pump comprising:
a pump main body that accommodates a pump unit and a motor; and
a plate-shaped elastic member that is wound around an outer circumference of the pump main body such that a longitudinal direction of the elastic member extends along a circumferential direction of the pump main body,
wherein the elastic member is provided with a pair of first locking portions, one first locking portion of the pair of first locking portions being provided at one end portion of the elastic member in the longitudinal direction, another first locking portion of the pair of first locking portions being provided at another end portion of the elastic member in the longitudinal direction,
the outer circumference of the pump main body is provided with a pair of first locking target portions that are locked to the pair of first locking portions,
the elastic member is provided with a second locking portion at a central portion in the longitudinal direction,
the outer circumference of the pump main body is provided with a second locking target portion that is locked to the second locking portion, and
1) the second locking portion comprises a protrusion on the elastic member and the second locking target portion comprises a hole in the outer circumference or 2) the second locking portion comprises a hole in the elastic member and the second locking target portion comprises a protrusion on the outer circumference.

2. The electric pump according to claim 1,
wherein the elastic member is provided with upright portions on opposite sides of the elastic member in a transverse direction of the elastic member, the upright portions extending along the longitudinal direction of the elastic member and wherein each upright portion of the elastic member comes into contact with the pump main body.

3. The electric pump according to claim 1,
wherein the pair of first locking portions are holes that penetrate through the elastic member in a plate thickness direction thereof, and the pair of first locking target portions are hooks that are upright on the outer circumference of the pump main body and are inserted into the holes,
each of the holes is formed by communicating a first hole positioned on a side closer to the pump main body in the plate thickness direction and a second hole positioned on a side away from the pump main body, and
when viewed from an outer side of the pump main body in a radial direction, the second hole is formed to be wider than the first hole toward an end portion side of the elastic member in the longitudinal direction, and a top portion of each of the hooks is positioned in the second hole.

4. A mounting structure of an electric pump in which the electric pump according to claim 1 is mounted on a mounting member,
wherein an outer circumference side of the elastic member is fixed to the mounting member.

5. An electric pump comprising:
a pump main body that accommodates a pump unit and a motor; and
a plate-shaped elastic member that is wound around an outer circumference of the pump main body such that a longitudinal direction of the elastic member extends along a circumferential direction of the pump main body,
wherein the elastic member is provided with a pair of first locking portions, one first locking portion of the pair of first locking portions being provided at one end portion of the elastic member in the longitudinal direction, another first locking portion of the pair of first locking portions being provided at another end portion of the elastic member in the longitudinal direction,
the outer circumference of the pump main body is provided with a pair of first locking target portions that are locked to the pair of first locking portions,
the elastic member is provided with upright portions on opposite sides of the elastic member in a transverse direction of the elastic member, the upright portions extending along the longitudinal direction of the elastic member and wherein each upright portion of the elastic member comes into contact with the pump main body,
the elastic member is provided with a second locking portion at a central portion in the longitudinal direction,
the outer circumference of the pump main body is provided with a second locking target portion that is locked to the second locking portion, and
1) the second locking portion comprises a protrusion on the elastic member and the second locking target portion comprises a hole in the outer circumference or 2) the second locking portion comprises a hole in the elastic member and the second locking target portion comprises a protrusion on the outer circumference.

6. The electric pump according to claim 5,
wherein the pair of first locking portions are holes that penetrate through the elastic member in a plate thickness direction thereof, and the pair of first locking target portions are hooks that are upright on the outer circumference of the pump main body and are inserted into the holes,
each of the holes is formed by communicating a first hole positioned on a side closer to the pump main body in the plate thickness direction and a second hole positioned on a side away from the pump main body, and
when viewed from an outer side of the pump main body in a radial direction, the second hole is formed to be wider than the first hole toward an end portion side of the elastic member in the longitudinal direction, and a top portion of each of the hooks is positioned in the second hole.

7. A mounting structure of an electric pump in which the electric pump is mounted on a mounting member,
wherein the electric pump includes:
a pump main body that accommodates a pump unit and a motor; and
a plate-shaped elastic member that is wound around an outer circumference of the pump main body such that a longitudinal direction of the elastic member extends along a circumferential direction of the pump main body,
the elastic member is provided with a pair of first locking portions, one first locking portion of the pair of first locking portions being provided at one end portion of the elastic member in the longitudinal direction, another first locking portion of the pair of first locking portions being provided at another end portion of the elastic member in the longitudinal direction,
the outer circumference of the pump main body is provided with a pair of first locking target portions that are locked to the pair of first locking portions, the elastic member is provided with upright portions on opposite sides of the elastic member in a transverse direction of the elastic member, the upright portions extending along the longitudinal direction of the elastic member and wherein each upright portion of the elastic member comes into contact with the pump main body, the elastic member is provided with a second locking portion at a central portion in the longitudinal direction, the outer circumference of the pump main body is provided with a second locking target portion that is locked to the second locking portion, and 1) the second locking portion comprises a protrusion on the elastic member and the second locking target portion comprises a hole in the outer circumference or 2) the second locking portion comprises a hole in the elastic member and the second locking target portion comprises a protrusion on the outer circumference, and an outer circumference side of the elastic member is fixed to the mounting member.

\* \* \* \* \*